No. 889,077. PATENTED MAY 26, 1908.
F. WICKS.
SPRING WHEEL FOR ROAD VEHICLES.
APPLICATION FILED JUNE 29, 1906.

2 SHEETS—SHEET 2.

Witnesses
Frank Hough
John F. Byrne

Inventor
F. Wicks
By Victor J. Evans
Atty.

UNITED STATES PATENT OFFICE.

FREDERICK WICKS, OF ESHER, ENGLAND.

SPRING-WHEEL FOR ROAD-VEHICLES.

No. 889,077.  Specification of Letters Patent.  Patented May 26, 1908.

Application filed June 29, 1906. Serial No. 324,081.

*To all whom it may concern:*

Be it known that I, FREDERICK WICKS, author, a subject of the King of Great Britain and Ireland, residing at Halfway Lodge, Esher, in the county of Surrey, England, have invented new and useful Improvements in Spring-Wheels for Road-Vehicles, of which the following is a specification.

My invention is designed to form a wheel for road vehicles, which although made of metal shall be resilient at the periphery. I form the periphery of a number of pedals, each forming a section of the periphery, and each section being capable of resilience independently of any other pedal or section. These pedals are arranged in series forming with the intervening space between each a ring of segments extruded beyond the solid framework of the wheel with a division between each. While one series or ring of pedals would be sufficient to carry a vehicle of light weight, two or more can be provided for heavier vehicles.

In the accompanying drawings I represent a wheel having a periphery composed of four series of pedals suitable for bearing vehicles of a medium weight.

Figure 1:
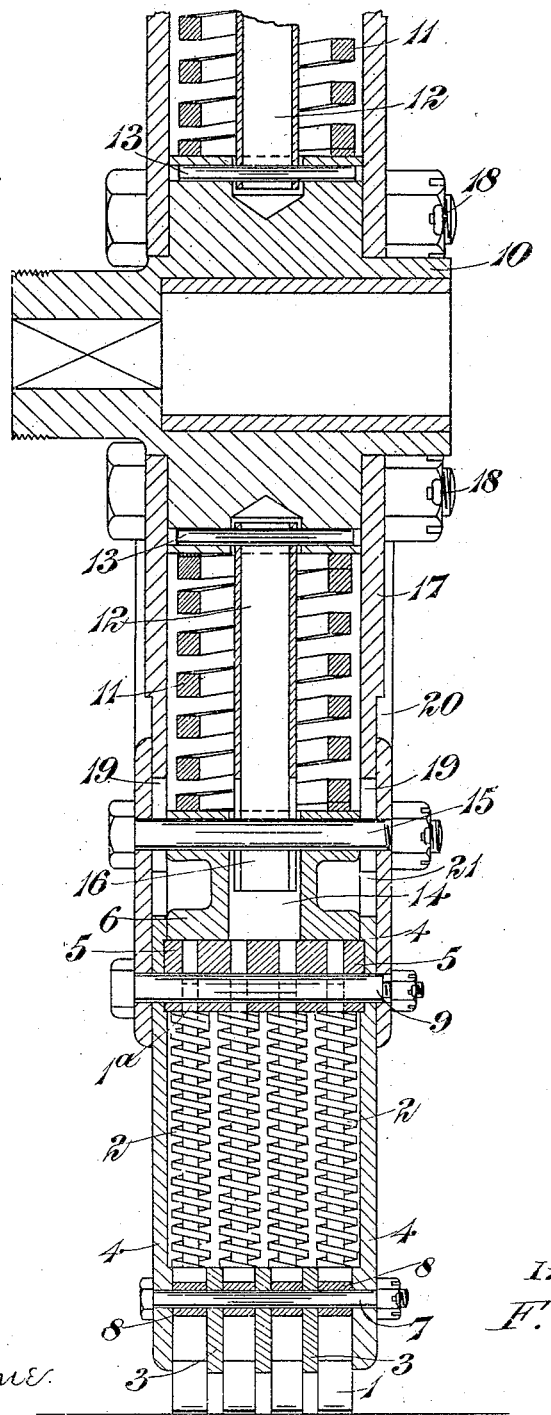
Figure 2:
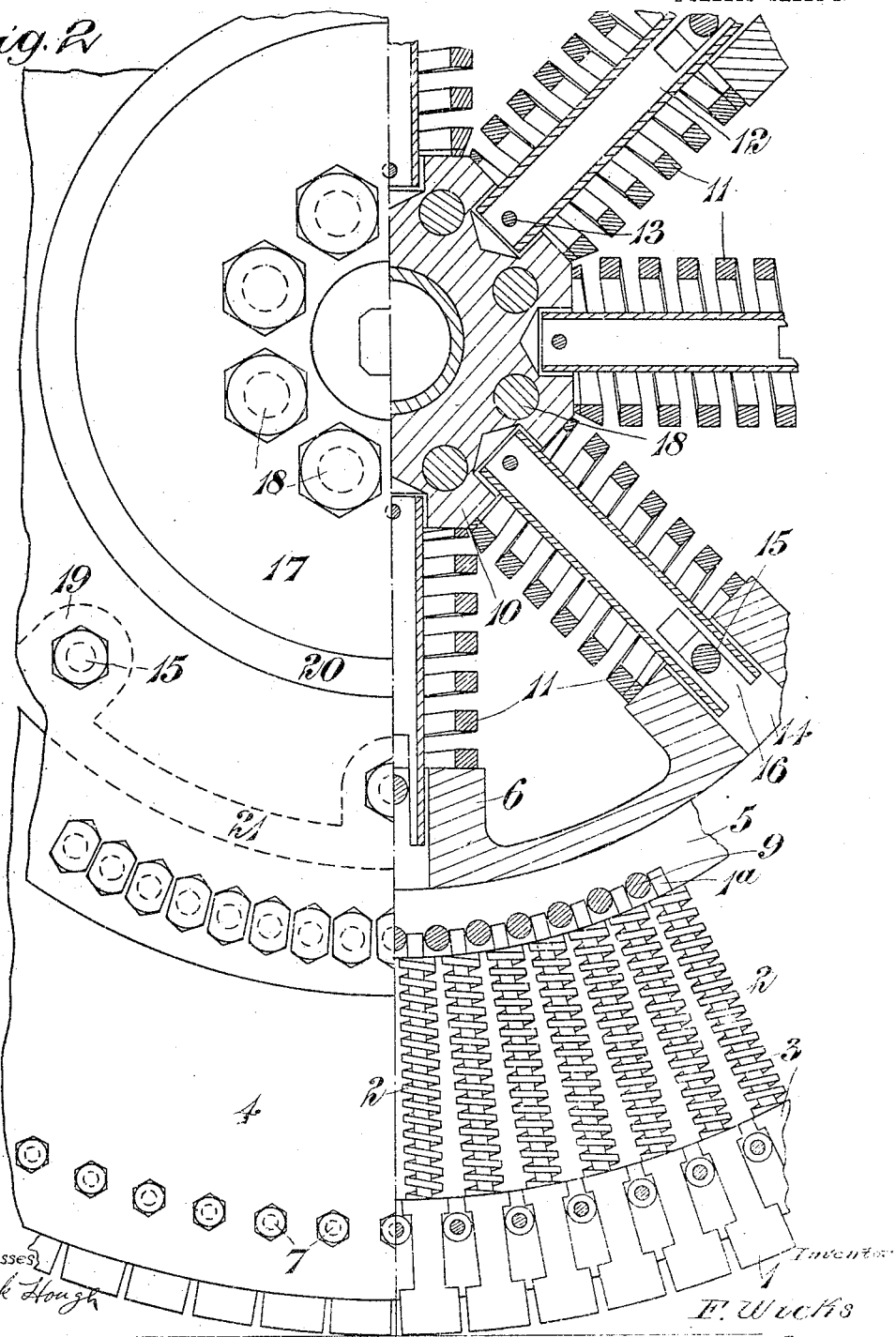

Figure 1 represents a section of the wheel from the hub to the periphery on one side of the wheel and extending half way to the other side where it is broken off. Fig. 2 represents an elevation of the wheel. On the left is shown the outside covering; on the right the coverings are removed, exposing the internal arrangement.

The pedals numbered 1 at the exterior part and 1ª at the interior or shank are formed preferably of case hardened steel and are forced outwards by the springs 2.
These pedals each controlled by its spring are extruded beyond the framework of the wheel round the whole of the periphery in a circle. A side view of these pedals is shown in Fig. 2 and an end view in Fig. 1. Each series of pedals is at the periphery divided from its companion series by a ring of steel 3, and the whole series of pedals and dividing rings is inclosed by the two exterior disks 4. The shanks 1ª of the series of pedals are divided by corresponding rings 5 and the exterior disk 4 which also incloses an inner ring 6. This inner ring 6 and the series of rings 5 sustaining the springs 2 which extrude the pedals 1 from the base of the periphery. The bolts and nuts 7 carry upon them rollers 8 between each of the pedals transversely and pass through the rings 3 and the outer disks 4 thus holding together the several parts and providing by means of the rollers for the easy movement of the pedals inwards and outwards. The shanks 1ª of the pedals are held in position by the rings 5 and by the bolts 9 running transversely in unison with the bolts 7. The rollers, their axles, and the pedals themselves form a compact ring around the whole circumference on the line of the rollers 8. In the same way the shanks of the pedals, the dividing rings 5 and the bolts 9 also form a compact body on the line of the bolts 9 steadying the ingress and egress of the pedals as they meet with obstruction or inequality on the roadway and adapt themselves to the inequalities as they pass over them.

Further resilience is provided between the ring 6 and the hub 10 by the springs 11 which are held in position by the tubular guides 12 being pinned to the hub at 13. These tube guides traverse the aperture 14 in the ring 6 and are held at the outer end in position by the bolt 15 working within the slot 16. The disk 17 incloses this inner circle of springs which rest upon the hub 10 to which also the covering disk is bolted by the bolts 18. There are other ways in which this supplementary resiliency may be secured by the provision of springs between the outer part of the wheel and the hub, but they would in each case be in the nature of a telescopic motion realized by depression and recoil of springs. The range of expansion and depression provided by my invention is restricted by the slot 19 shown in dotted lines in the disk 17 in Fig. 2 and in full lines in Fig. 1. Corresponding spaces 20 and 21, the latter being shown in dotted lines in Fig. 2, also prescribe the limit of resilience allowed to these inner springs, such limit being arbitrary and to be varied as circumstances may require.

What I claim and desire to secure by Letters Patent of the United States is:—

1. A vehicle wheel including a periphery consisting of disks, means adapted to secure the disks together, rollers mounted upon said means, and pedals resiliently supported between the disks.

2. A vehicle wheel including a periphery consisting of disks, rings, pedals resiliently mounted between the rings, means for securing the disks and rings together, and rollers mounted upon said means.

3. A vehicle including a resiliently mounted ring, disks, rings mounted between the disks, pedals resiliently supported between the last named rings, and means adapted to secure the disks and said last named rings together.

4. A vehicle wheel including a periphery consisting of disks, rings, pedals resiliently mounted between the rings, and means for securing the disks and rings together.

5. A vehicle wheel comprising a hub, a ring resiliently secured to said hub, disks secured to said ring, and pedals resiliently mounted between the disks.

6. A vehicle wheel comprising a hub, guides secured to the hub and provided with slots in their outer ends, a ring provided with apertures for the reception of the guides, whereby the ring is slidably mounted thereon, bolts passed through the ring and said slots to limit the inward movement of the ring, springs interposed between the ring and the hub, and a resilient periphery secured to the ring.

In testimony whereof I have signed my name to this specification in the presence of two subscribing witnesses.

FREDERICK WICKS.

Witnesses:
H. W. JAMESON,
F. L. RAND.